United States Patent [19]
Kofflin

[11] Patent Number: 5,927,355
[45] Date of Patent: Jul. 27, 1999

[54] PRE-CONDITIONED AIR ADAPTER

[75] Inventor: David F. Kofflin, Bloomington, Minn.

[73] Assignee: Kofflin Equipment, Minneapolis, Minn.

[21] Appl. No.: 08/929,324

[22] Filed: Sep. 12, 1997

[51] Int. Cl.⁶ .................................................. B65B 1/04
[52] U.S. Cl. ........................ 141/383; 141/113; 141/384; 141/387; 141/389; 141/391; 244/118.5
[58] Field of Search .................... 141/391, 390, 141/113, 387, 389, 312, 384, 383; 193/3; 244/118.5; 217/90; 439/927; 428/66.4; 383/60; 285/379; 277/619, 624, 638, 654; 220/582, 315, 344, 378

[56] References Cited

U.S. PATENT DOCUMENTS

| | | | |
|---|---|---|---|
| 1,354,904 | 10/1920 | Glass | 277/619 |
| 2,071,322 | 2/1937 | Balfe | 288/1 |
| 2,345,515 | 3/1944 | Tweedale | 277/624 |
| 2,665,926 | 1/1954 | Fraser . | |
| 2,680,030 | 6/1954 | Hoelzer . | |
| 2,729,471 | 1/1956 | Fraser . | |
| 2,737,401 | 3/1956 | Lindsay . | |
| 3,045,721 | 7/1962 | Shepherd et al. . | |
| 3,055,405 | 9/1962 | Pase . | |
| 3,086,565 | 4/1963 | Mosher . | |
| 3,298,794 | 1/1967 | Mikesell, Jr. et al. | 220/378 |
| 3,330,313 | 7/1967 | Rosell . | |
| 3,825,212 | 7/1974 | Darges et al. . | |
| 5,058,636 | 10/1991 | Simmel et al. . | |
| 5,299,763 | 4/1994 | Bescoby et al. . | |
| 5,355,917 | 10/1994 | Kofflin . | |
| 5,740,846 | 4/1998 | Larson et al. | 141/389 |

OTHER PUBLICATIONS

"Air–a–plane Corporation Hose and Adapter Assembly A07–131", *Operation, Parts and Service Manual*, p. 16 (1991).

"Air–a–plane Corporation Air Delivery Hose Assembly A07–139", *Operation, Parts and Service Manual*, p. 2 (1991).

Advertisement, *GSE Today*, front cover and p. 7 (Oct. 1996).

"JB723 Aircraft Connector for Air Conditioning and Heating", *J&B Aviation Services, Inc.* (Date Unknown).

"Devtec Corporation Aircraft Coupler", *Devtec Corporation* (Date Unknown).

Kofflin Equipment "Description of Sales Activities of Earlier Version" (more than 1 year prior to Sep. 12, 1997).

*Primary Examiner*—Henry J. Recla
*Assistant Examiner*—Timothy L. Maust
*Attorney, Agent, or Firm*—Merchant & Gould P.C.

[57] ABSTRACT

A pre-conditioned air adapter for attaching an air access port of an aircraft to a pre-conditioned air unit made of an integral one-piece plastic body, a clamp connected to the body, a hook connected to the clamp, a strengthening ring member secured to a top end of the adapter body, and a gasket secured to the ring member. The ring member may be metal and may be bolted to the top end of the adapter. Further, the hook may have a tip that is angled toward central longitudinal axis of the adapter body.

24 Claims, 5 Drawing Sheets

PRE-CONDITIONED AIR ADAPTER

FIELD OF THE INVENTION

The present invention is directed to a connector for an air system, and more particularly to a connector for connection to an aircraft while on the ground.

BACKGROUND OF THE INVENTION

While on the ground, an aircraft is connected to a pre-conditioned air unit. The pre-conditioned air unit provides the aircraft's cabin with ventilation while the aircraft is parked and being serviced at the gate. The pre-conditioned air unit may be either heat or air conditioning, depending on the climate conditions. Each aircraft has an air access port in order to receive preconditioned air on the ground. A pre-conditioned air adapter is a part that is attached to the air access port of the aircraft and acts as a transition piece to the ground unit at the gate. The ground crew secures the air adapter to the air access port, and the air adapter is connected to a link of vinyl or canvas ducting that leads to the ground unit.

In the past, pre-conditioned air adapters were made of heavy aluminum or steel. These adapters were large, heavy, difficult to handle, and easily damaged. The aluminum or steel preconditioned air adapters were vulnerable to dents, nicks, and rust, and if dropped will lose its shape and ducting will no longer fit over the end.

An improved pre-conditioned air adapter is made of plastic and is lightweight and easy to handle. This new plastic pre-conditioned air adapter is described in my U.S. Pat. No. 5,355,917, which is incorporated herein by reference in its entirety. The air adapter described in U.S. Pat. No. 5,355,917 is considerably lighter in weight, less bulky and more durable than previous metal air adapters.

However, the plastic air adapter of U.S. Pat. No. 5,355,917 is made of two pieces of molded plastic, welded together with plastic welding, so that the welding seams run longitudinally top to bottom on opposite sides of the adapter. These adapters are not as strong as the metal adapters, and the body may split at the welding seam after heavy use.

Therefore, a pre-conditioned air adapter that is lightweight, easy to handle, durable, and with improved strength is desired.

SUMMARY OF THE INVENTION

A pre-conditioned air adapter is described for attaching to an air access port of an aircraft and to a pre-conditioned air unit. The pre-conditioned air adapter includes a one-piece adapter body comprising a plastic composite, and defines a longitudinal bore. At the top end of the body, a rim is defined with an opening through the rim. The pre-conditioned air adapter further includes a pair of clamps operatively connected to the body, a pair of hooks, each connected to a clamp, and each hook extending through one of the openings in the rim. The pre-conditioned air adapter also includes a metal ring secured to the rim at the top end of the body and having a hole in alignment with the opening in the rim.

BRIEF DESCRIPTION OF THE DRAWINGS

The invention may be more completely understood by considering the detailed description of various embodiments of the invention which follows in connection with the accompanying drawings.

Figure 1:
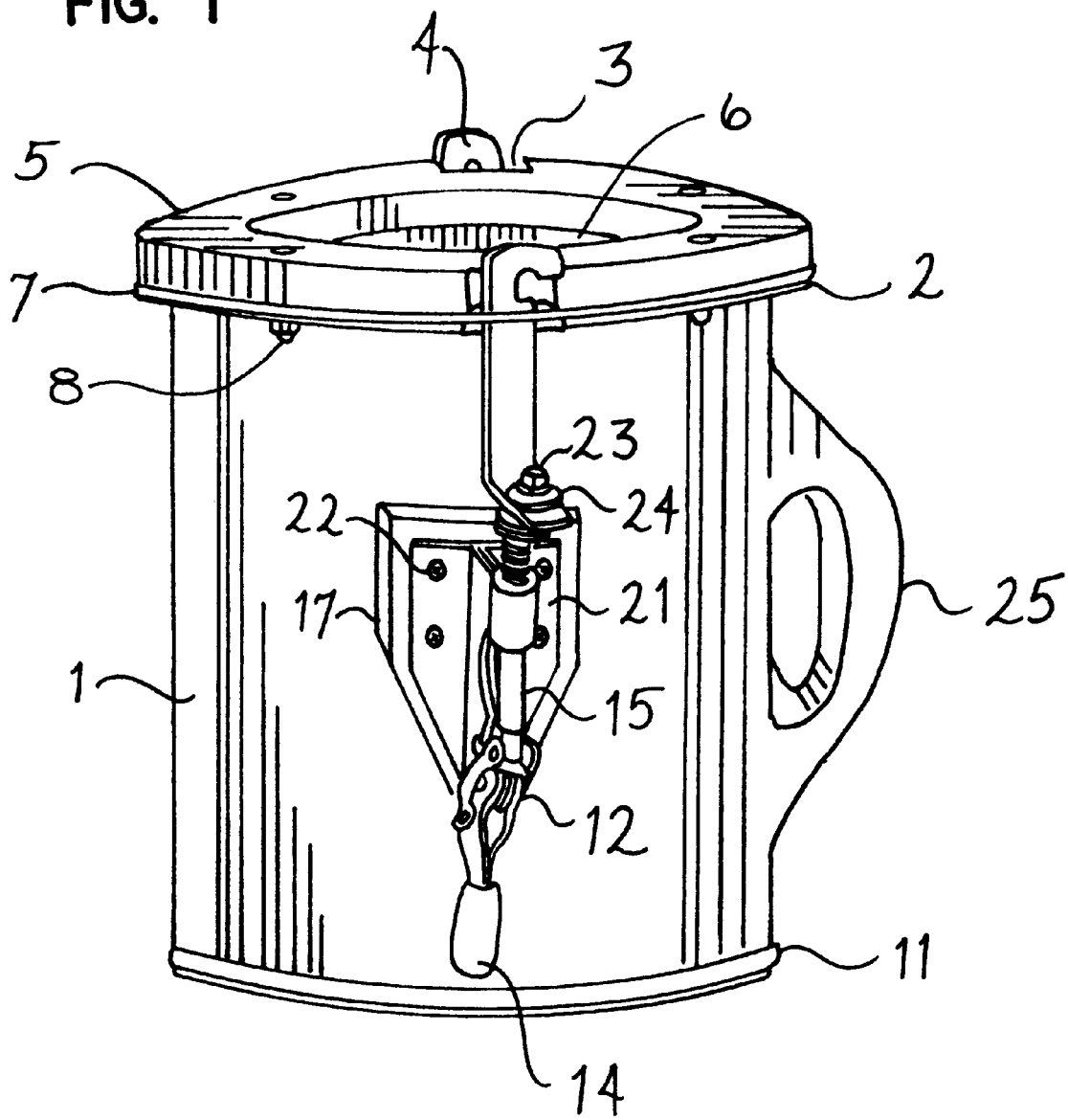
FIG. 1 shows a perspective view of the pre-conditioned air adapter of the present invention.

While the invention is amenable to many modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives following within the spirit and scope of the invention as defined by the appended claims.

DETAILED DESCRIPTION OF THE DRAWINGS

The present invention is believed to be applicable to a variety of systems and arrangements for connecting ventilation systems, for example, connecting a pre-conditioned air unit on the ground with an aircraft air access port. The invention is not so limited, and an appreciation of various aspects of the invention is best gained through a discussion of various application examples operating in such an environment.

As discussed in the background of the invention, the pre-conditioned air adapter may be used by an aircraft ground crew to attach the pre-conditioned air unit to an aircraft. The pre-conditioned air unit will provide the aircraft with air conditioning or heat, while the aircraft is at the gate or is being serviced, for the comfort of its passengers. The ground crew personnel need to connect a length of canvas or vinyl ducting that is connected to the pre-conditioned air unit with the aircraft air connection port. The adapter of the present invention is very useful for this purpose.

A bottom end of the adapter will be attached to the ducting, probably using a band clamp. A top end of the adapter will be secured to the aircraft air connection port.

Figure 2:
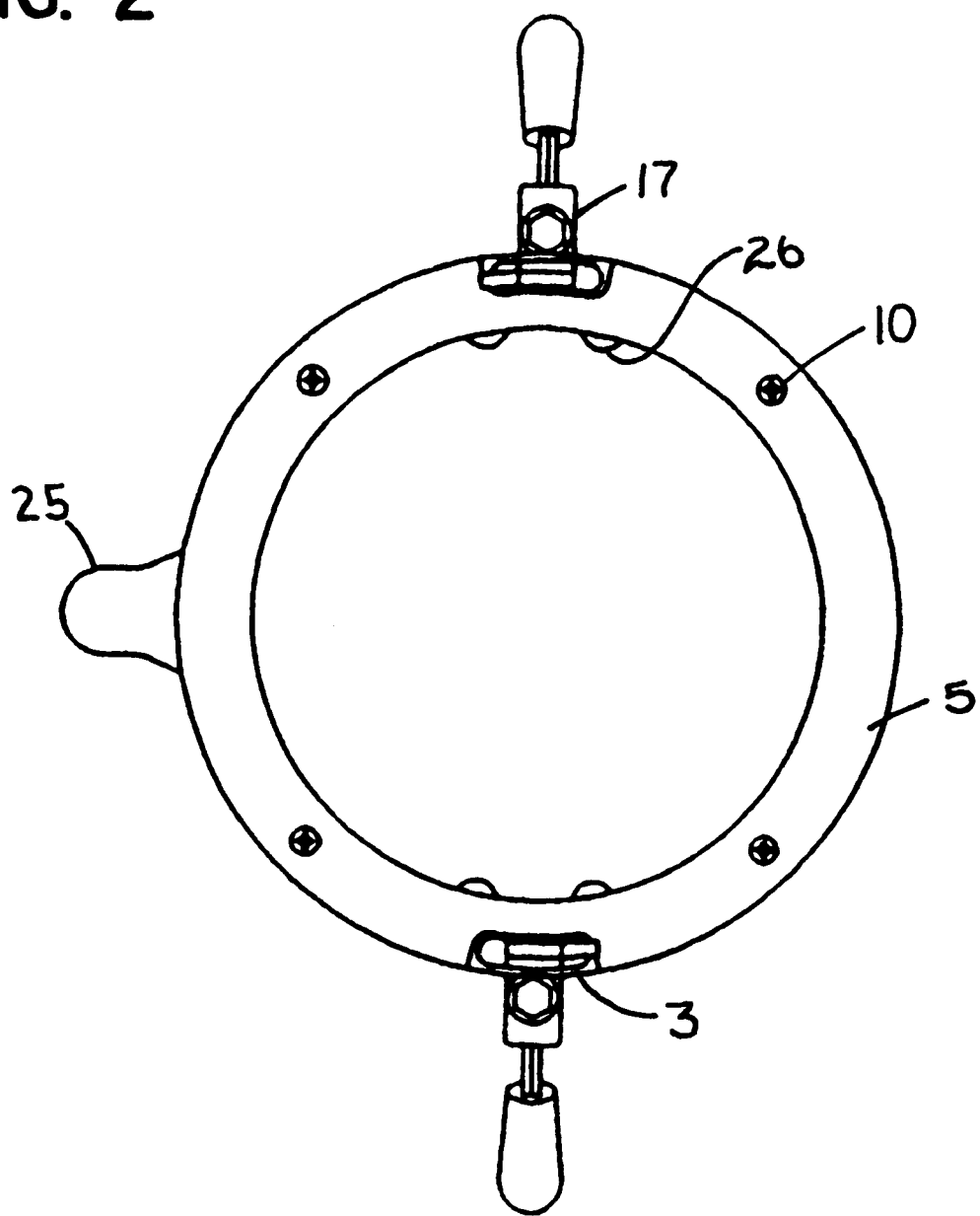
FIG. 2 shows a top view of the pre-conditioned air adapter of the present invention.

FIG. 1 and FIG. 2 illustrate one particular embodiment in which a body 1 of the adapter is a one-piece molded plastic structure. FIG. 1 shows a side view and FIG. 2 shows a top view. The use of a molded one-piece body 1 increases the strength of the adapter. The outer surface of the body 1 may be substantially cylindrically shaped as in FIG. 1. The interior surface of the body defines a longitudinal bore 6 through which the pre-conditioned air will travel from the unit to the aircraft.

The body 1 includes a rim 2 at the top end of the body. The rim 2 has at least one opening to accommodate a hook 4. The hook 4 is used to attach the body to an access port on an aircraft. One or more hooks 4 may be used to secure the adapter to the access port. Preferably, two hooks 4 are used that are axially opposed on the body. The number of openings in the rim corresponds to the number of hooks used.

The body 1 may be constructed using a plastic composite material by rotationally molding the body. In one embodiment, a high-density polyethylene composite material may be used for the body. This material is lightweight, durable, impact resistant, and will not split apart as did the original two-piece welded plastic adapter occasionally. The polyethylene composite material also has the advantage that it will not be vulnerable to nicks, dents, or rust. The polyethylene material does not require paint.

The adapter of the present invention may also include a reinforcing metal ring 7 that is secured to the rim 2 at the top end of the body 1. The addition of the metal ring 7 to the adapter adds strength to the top of the unit. One method for securing the metal ring 7 to the rim 2 is to use bolt 10 and nut 8, making the rim easily replaceable. Nut 8 is visible in the side view of the adapter in FIG. 1, while bolt 10 is visible in the top view of the adapter shown in FIG. 2. Other connection methods are also possible, such as bonding or adhesive. The metal ring 7 has holes to accommodate bolts 10. The metal ring 7 may preferably be made of aluminum. For added durability, the metal ring 7 may be anodized and heat-treated.

The metal ring 7 also has hook holes, in addition to the holes for the bolts. As can be seen in FIG. 1, the hook hole in the metal ring 7 is a closed hole. Therefore, the metal ring 7 assists in hook alignment on the adapter body because it ensures that if the hooks 4 fit into the hookholes, then the hooks will accurately correspond to access port slots. The number of closed hook holes in metal ring 7 corresponds to the number of hooks used.

A gasket 5 is positioned on top of the metal ring 7 in order to establish a tight, secure fit against the aircraft's air access port. The gasket 5 may be attached to the metal ring 7 by many methods, for example by using an adhesive. The gasket 5 is preferably made of Poron® polyurethane plastic material which is a high-density microcellular polyurethane. The Poron® plastic material does not change its form under pressure and remains soft and supple through a wide range of temperatures. The gasket may be manufactured by many different companies, such as Lundell Manufacturing Corporation, Plymouth, Minn. Holes may be formed in the gasket so that the bolts 10 are accessible for rapid ring replacement, if necessary. Openings 3 are also defined in the gasket to accommodate the hooks 4.

One example of an acceptable adhesive for bonding the gasket 5 to the metal ring 7 is a pressure sensitive high strength acrylic adhesive manufactured by Minnesota Mining and Manufacturing Company. The adhesive may be applied by the gasket manufacturer, who provides an easy-release peel off paper over the adhesive. The gasket adhesive of one embodiment is provided by Lundell Manufacturing Corporation, Plymouth, Minn., and has a peel strength on stainless steel of 40 ounces per inch.

Clamps 12 are used to secure the adapter to the air access port. Many different types of clamps could be used for securing this connection. In one embodiment of the invention, each clamp is operatively coupled to a hook 4 that extends upward to above the top end. As discussed above, the hook 4 is accommodated by openings in the rim 2 and the gasket 5 and a closed hole in the metal ring 7. The clamp 12 is used to actuate the hook 4 up and down. When the hook is up, the adapter is positioned next to the air access port and the hooks 4 are aligned with corresponding openings at the air access port. The adapter is turned so that the corresponding portions of the air access port slide within the notch on the hook 4. Then a clamp handle 14 is used to move the hook 4 down, pulling the top end of the adapter toward the port and securing the adapter to the air access port. The clamp 12 includes a rod 15 that is attached to the hook 4 by a nut 23 and a washer 24. The clamp also includes a base plate 21 that is operatively coupled to the body 1. One method of coupling the clamp base plate 21 to the body 1 is using screws 22.

The clamp 12 may be a positive locking clamp made by Destaco®. Preferably, the positive locking clamp is Destaco® model 609-16RV steel clamp. The clamp may be zinc coated. Preferably, one clamp is provided for each hook. However, it is possible to construct an adapter with other configurations, for example, where one clamp is connected to multiple hooks.

In one embodiment of the present invention, the body 1 may include molded pads 17 to which the clamps are mounted. The molded pads 17 provide additional strength to the body at the attachment point of the clamp base plate 21. The molded pads 17 are molded into the body structure at manufacture. The pads 17 may be molded to include threaded inserts to accept the screws 22. The profile of the threaded inserts 26 can be seen in FIG. 2, a top view of the adapter. In one embodiment, four inserts are provided for attaching the clamp base to the mounting pad.

At the bottom end of the body 1, a molded bead 11 may be provided. Bead 11 is a raised area that is molded into the plastic at manufacture that may be used to assist in affixing ducting to the adapter. Frequently, ducting is attached to the adapter using a band clamp. The bead 11 can help prevent a band clamp from slipping off the adapter.

Another possible feature of the body 1 is an ergonomic carrying handle that may be molded into the body between the two clamp pads 17. In one embodiment, the handle 25 may be disposed longitudinally, so that it is parallel to a longitudinal axis of the body 1. Ground crews may find the handle useful to assist them in positioning the adapter. More than one handle may also be molded into the body, and different handle configurations are possible and contemplated by this invention. Alternatively, the adapter may not have a handle.

Figure 3:
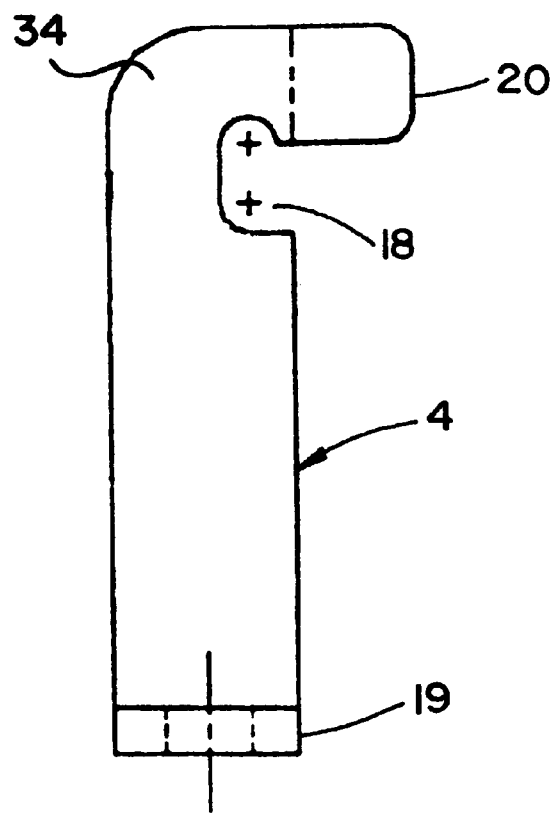
FIG. 3 shows a side view of a hook that may be used in one embodiment of the pre-conditioned air unit.

FIG. 3 shows a side view of one embodiment of the hook 4. The hook has a base portion 19 that attaches to the clamp. The base portion 19 is better illustrated in FIG. 4, which is a side view of one embodiment of the hook. A coupling hole 28 is defined in the base portion 19, for bolting to the clamp. A notch 18 in the hook is the portion of the hook that engages a corresponding part in the aircraft's air access port. The access port has a diameter that is standard on all aircraft, according to Military Standard MS 33562(ASG), entitled "Connection, Aircraft Ground Air Conditioning, 8 inch, minimum requirements." However, some access ports are provided with four slots for receiving the hooks on the adapter while some access ports have two slots. In addition, access ports may have ledges on which the hooks rest instead of slots.

Figure 4:
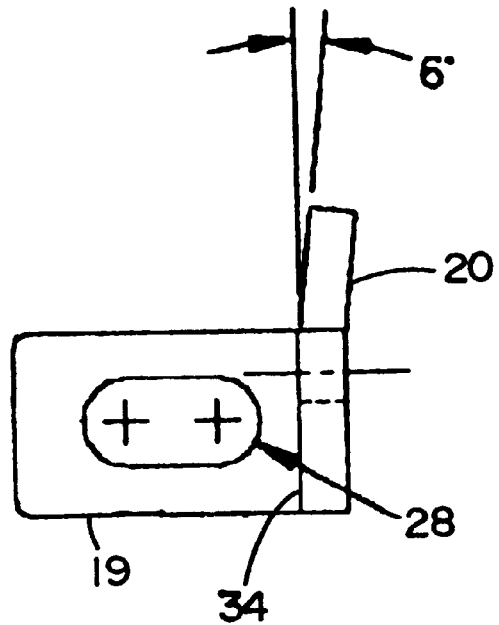
FIG. 4 shows a top view of a hook that may be used in one embodiment of the preconditioned air unit.

The hook has a flat face 34 in one embodiment, which is facing the viewer in FIG. 3. Extending beyond the hook notch 18 in FIG. 3 is a tip 20, which is shown from the top in FIG. 4. The tip 20 will be inserted into an opening on the access port as the adapter is rotated. FIG. 4 illustrates that the tip 20 is angled 6 degrees from the face 34 in one particular embodiment of the invention. This offset results in easier alignment of the hooks with the air connection port. When the tip portion of the hook is not angled by 6 degrees, then rotating the tip into the air access port slots is more difficult. The hook portion of the clamp may be coated with black oxide for longer life.

Figure 5:
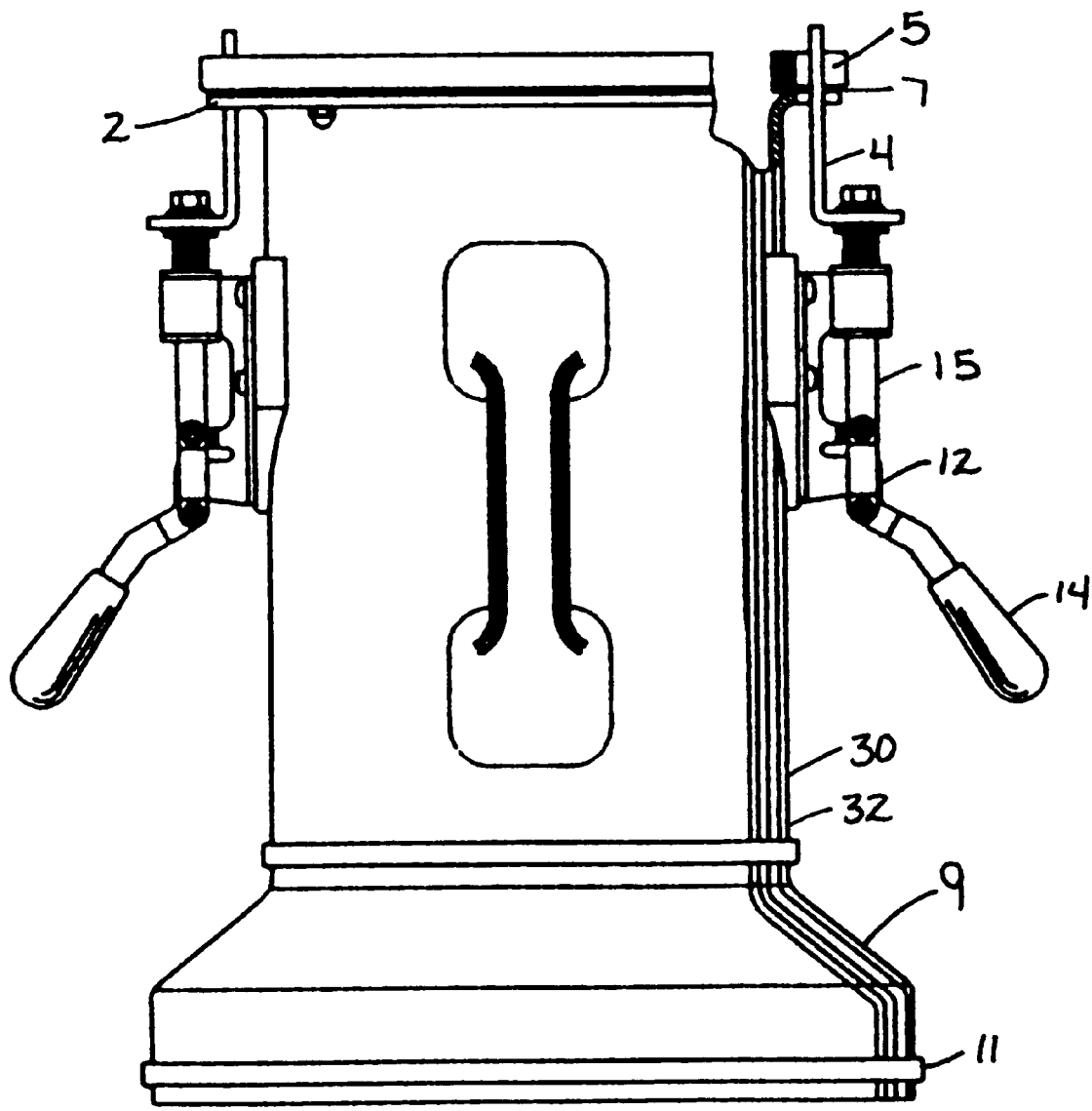
FIG. 5 shows a side view of another embodiment of the pre-conditioned air adapter of the present invention.

In one embodiment, the adapter is substantially cylindrical, as shown in FIG. 1. However, different connection applications require different configurations of the adapter, such as accommodating a larger-diameter ducting connection. FIG. 5 shows an adapter of the present invention with a differently configured body 32. The body 32 has a substantially cylindrical portion 30 and a bell-shaped portion 9. Other parts of the adapter shown in FIG. 5 are identical to the adapter shown in FIG. 1, such as the rim 2, the gasket 5, and the clamp 12.

Figure 6:
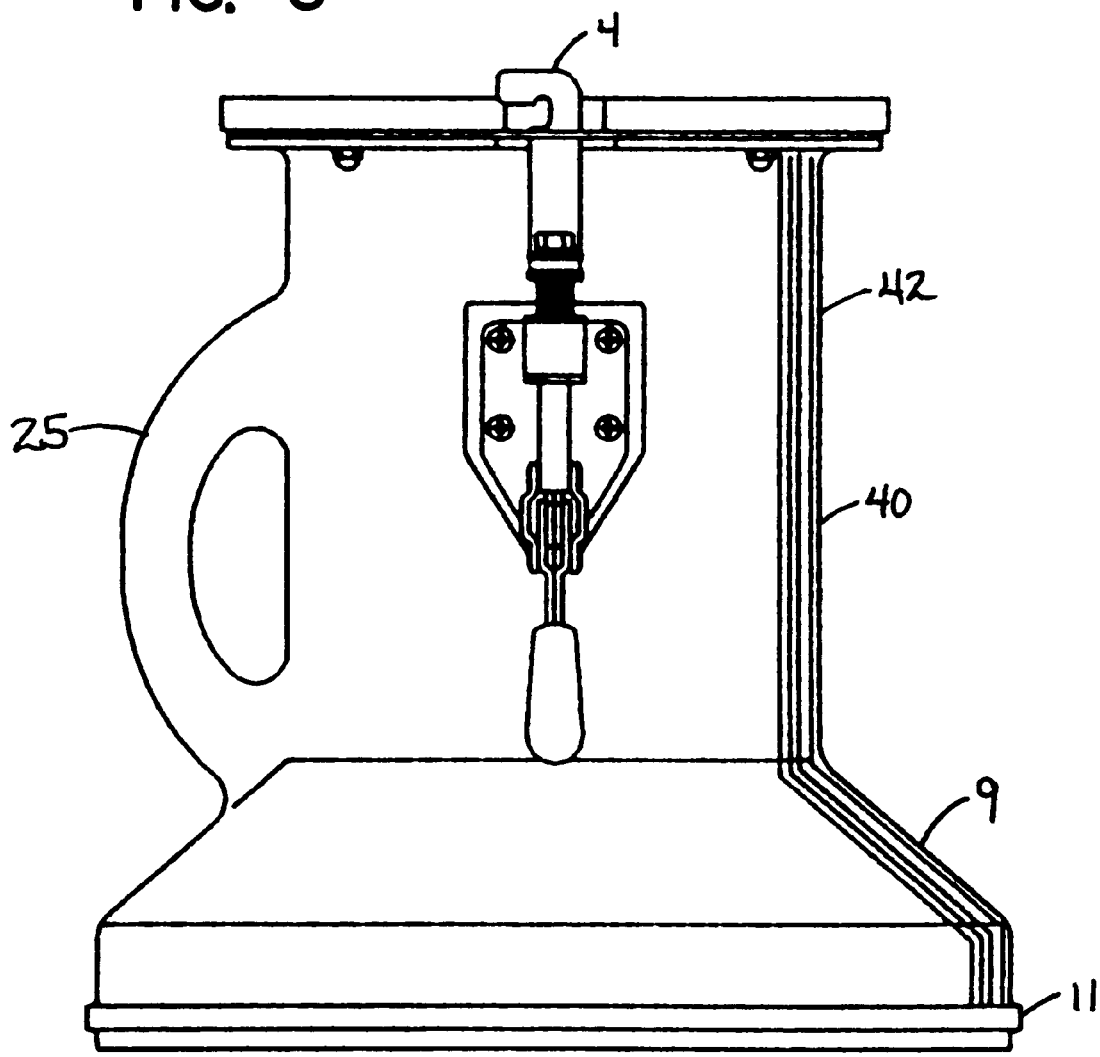
FIG. 6 shows a side view of another embodiment of the pre-conditioned air adapter of the present invention.

FIG. 6 shows a side view of yet another adapter configuration according to the present invention. The body 42 shown in FIG. 6 has a substantially cylindrical portion 40 and a bell-shaped portion 9 for use with different types of ducting. Other parts of the adapter shown in FIG. 6 are identical to the adapter embodiments described herein.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true scope of the present invention which is set forth in the following claims.

What is claimed:

1. A pre-conditioned air adapter for attaching to an air access port of an aircraft and a pre-conditioned air unit, comprising:
   an integral one-piece adapter body comprising a plastic composite, the body defining a longitudinal bore, the body having a top end, the top end comprising a rim defining an opening therethrough, the top end being adapted for attachment to the air access port, and having a bottom end for attachment to a pre-conditioned air unit;
   a clamp operatively connected to the body;
   a hook, operatively connected to the clamp, the hook extending through the opening in the rim and securable to the air access port;
   a metal ring secured to the rim, the metal ring having a hole in alignment with the opening in the rim, wherein the metal ring adds strength to the top end of the body; and
   a polyurethane gasket secured to the ring.

2. The pre-conditioned air adapter of claim 1, further comprising:
   a second clamp, operatively connected to the body; and
   a second hook, operatively connected to the second clamp, the hook extending through a second opening in the rim and through a second hole in the metal ring and securable to the air connection port.

3. The pre-conditioned air adapter of claim 1, wherein the metal ring is comprised of aluminum.

4. The pre-conditioned air adapter of claim 1, wherein the metal ring is heat-treated and anodized.

5. The pre-conditioned air adapter of claim 1, wherein the metal ring is bolted to the top end of the adapter body.

6. The pre-conditioned air adapter of claim 1, the body having a handle integral with the exterior of the body.

7. The pre-conditioned air adapter of claim 6, the handle being disposed parallel to a longitudinal axis of the body.

8. The pre-conditioned air adapter of claim 1, the body being substantially cylindrical.

9. The pre-conditioned air adapter of claim 1, wherein the hook is comprised of steel.

10. The pre-conditioned air adapter of claim 1, wherein the hook is coated with black oxide.

11. The pre-conditioned air adapter of claim 1, wherein the hook is heat-treated.

12. The pre-conditioned air adapter of claim 1, wherein the body includes an integral mounting pad in alignment with the clamp, and the clamp is operatively coupled to the mounting pad.

13. The pre-conditioned air adapter of claim 12, wherein the mounting pad defines at least one threaded insert for receiving a screw to secure the clamp to the body.

14. The pre-conditioned air adapter of claim 1, wherein the body comprises polyethylene.

15. The pre-conditioned air adapter of claim 1, wherein the body comprises high-density polyethylene.

16. The pre-conditioned air adapter of claim 1, wherein a molded bead encircles the bottom end of the body.

17. The pre-conditioned air adapter of claim 1, wherein the hook has a first surface and a tip, and where the tip is angled from the first surface by 6 degrees toward a central longitudinal axis of the body.

18. A pre-conditioned air adapter for attaching to an air access port of an aircraft and a pre-conditioned air unit, comprising:
   an integral one-piece adapter body comprising a plastic composite, the body defining a longitudinal bore, the body having a top end, the top end comprising a rim defining an opening therethrough, the top end being adapted for attachment to the air access port, and having a bottom end for attachment to a pre-conditioned air unit;
   a clamp operatively connected to the body;
   a hook, operatively connected to the clamp, the hook extending through the opening in the rim and securable to the air access port;
   a ring member secured to the rim, the ring member having a hole in alignment with the opening in the rim, wherein the ring member adds strength to the top end of the body; and
   a gasket secured to the ring member.

19. The pre-conditioned air adapter of claim 18, further comprising:
   a second clamp, operatively connected to the body; and
   a second hook, operatively connected to the second clamp, the hook extending through a second opening in the rim and through a second hole in the ring member and securable to the air connection port.

20. The pre-conditioned air adapter of claim 18, wherein the hook has a first surface and a tip, and where the tip is angled from the first surface toward a central longitudinal axis of the body.

21. The pre-conditioned air adapter of claim 20, wherein the tip is angled from the first surface by 6 degrees toward a central longitudinal axis of the body.

22. The pre-conditioned air adapter of claim 18, wherein the ring member is metal.

23. The pre-conditioned air adapter of claim 18, wherein the ring member is bolted to the top end of the adapter body.

24. A pre-conditioned air adapter for attaching to an air access port of an aircraft and a pre-conditioned air unit, comprising:

an integral one-piece adapter body comprising a plastic composite, the body defining a longitudinal bore, the body having a top end, the top end comprising a rim defining an opening therethrough, the top end being adapted for attachment to the air access port, and having a bottom end for attachment to a pre-conditioned air unit;

a clamp operatively connected to the body;

a hook, operatively connected to the clamp, the hook extending through the opening in the rim and securable to the air access port, wherein the hook has a first surface and a tip, and where the tip is angled from the first surface by 6 degrees toward a central longitudinal axis of the body; and a ring secured to the rim, the ring having a hole in alignment with the opening in the rim, wherein the ring adds strength to the top end of the body.

* * * * *